United States Patent
Wolff (10) Patent No.: US 12,434,642 B2
(45) Date of Patent: Oct. 7, 2025

(54) POWER SUPPLY SYSTEM AND METHOD

(71) Applicant: Transportation IP Holdings, LLC, Norwalk, CT (US)

(72) Inventor: Jeffrey John Wolff, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 519 days.

(21) Appl. No.: 17/225,322

(22) Filed: Apr. 8, 2021

(65) Prior Publication Data

US 2021/0316678 A1    Oct. 14, 2021

Related U.S. Application Data

(60) Provisional application No. 63/009,176, filed on Apr. 13, 2020.

(51) Int. Cl.
*B60R 16/03* (2006.01)
*H02M 5/458* (2006.01)

(52) U.S. Cl.
CPC ........... *B60R 16/03* (2013.01); *H02M 5/4585* (2013.01)

(58) Field of Classification Search
CPC ..... B60R 16/03; H02M 5/4585; H02M 1/007; H02M 3/1584; H02M 5/225; H02M 7/4807; Y02T 10/70
USPC .......................................................... 307/9.1
See application file for complete search history.

(56) References Cited

U.S. PATENT DOCUMENTS

| | | | |
|---|---|---|---|
| 6,031,738 A * | 2/2000 | Lipo | H02M 7/487 363/43 |
| 7,398,012 B2 | 7/2008 | Koellner | |
| 8,174,225 B2 | 5/2012 | Mazumdar et al. | |
| 8,497,591 B2 | 7/2013 | Daum et al. | |
| 8,499,909 B2 | 8/2013 | Mazumdar et al. | |
| 8,536,814 B2 | 9/2013 | Mazumdar et al. | |
| 8,550,008 B2 | 10/2013 | Mazumdar et al. | |
| 8,767,369 B2 | 7/2014 | Kuttenkuler et al. | |
| 9,227,515 B2 | 1/2016 | Wolff et al. | |

(Continued)

FOREIGN PATENT DOCUMENTS

| | | |
|---|---|---|
| CN | 204161137 U | 2/2015 |
| CN | 105449795 A | 3/2016 |

(Continued)

OTHER PUBLICATIONS

Mohammadamin Bahmani, "Design and Optimization of HF Transformers for High Power DC-DC Applications", Division of Electric Power Engineering, Department of Energy and Environment, Chalmers University of Technology, Goteborg, Sweden, 2014 (116 Pages).

(Continued)

*Primary Examiner* — Richard Tan
(74) *Attorney, Agent, or Firm* — K&L Gates LLP (57) ABSTRACT

A power supply system includes an onboard rectifier that may be disposed onboard an electric vehicle. The onboard rectifier is configured to receive an alternating current conducted from a power generating station via a transmission line at a frequency that is at least a utility power line frequency. The onboard rectifier may change the alternating current into a direct current and to output the direct current to an electric propulsion system of the electric vehicle to power the propulsion system and propel the electric vehicle.

17 Claims, 8 Drawing Sheets

(56) References Cited

U.S. PATENT DOCUMENTS

| | | | |
|---|---|---|---|
| 9,272,677 B2 | 3/2016 | Mazumdar | |
| 9,553,443 B2 | 1/2017 | Wolff et al. | |
| 9,806,659 B2 | 10/2017 | Murphy et al. | |
| 9,926,833 B2 | 3/2018 | Wolff et al. | |
| 10,173,532 B2 | 1/2019 | Nedley et al. | |
| 10,384,546 B2 | 8/2019 | Wolff et al. | |
| 10,384,559 B2 | 8/2019 | Kuttenkuler et al. | |
| 10,556,598 B2 | 2/2020 | Petrak et al. | |
| 10,845,426 B2 | 11/2020 | Daigle et al. | |
| 2009/0103341 A1* | 4/2009 | Lee | B60W 10/26 320/140 |
| 2010/0039054 A1 | 2/2010 | Young et al. | |
| 2011/0000721 A1* | 1/2011 | Hassett | B60L 15/2009 180/65.21 |
| 2011/0304289 A1* | 12/2011 | Burdick | H02P 27/06 318/400.3 |
| 2014/0354042 A1 | 12/2014 | Wolff et al. | |
| 2015/0318791 A1* | 11/2015 | Baumann | H02P 27/06 318/504 |
| 2016/0101700 A1 | 4/2016 | Brown et al. | |
| 2018/0278168 A1* | 9/2018 | Brown | H02J 7/022 |
| 2019/0168626 A1 | 6/2019 | Spesser | |
| 2019/0210478 A1 | 7/2019 | Mazumdar | |
| 2019/0329655 A1 | 10/2019 | Petrak et al. | |
| 2020/0238844 A1* | 7/2020 | Grace | B60L 53/18 |
| 2020/0290613 A1 | 9/2020 | Trainor et al. | |

FOREIGN PATENT DOCUMENTS

| | | |
|---|---|---|
| CN | 207303696 U | 5/2018 |
| CN | 209313744 U | 8/2019 |
| DE | 102010006125 A1 | 8/2011 |
| EP | 2241472 B1 | 4/2019 |
| JP | S61049603 A | 3/1986 |
| JP | H01133504 A | 5/1989 |
| JP | H04178117 A | 6/1992 |
| JP | 2010264924 A | 11/2010 |
| JP | 2018011412 A | 1/2018 |
| JP | 2019193405 A | 10/2019 |
| JP | 2019205299 A | 11/2019 |
| WO | 2011070609 A1 | 6/2011 |
| WO | 2017033328 A1 | 3/2017 |
| WO | 2018074329 A1 | 4/2018 |
| WO | 2019071154 A1 | 4/2019 |

OTHER PUBLICATIONS

ABB "Trolley assist for diesel-electric trucks in mining: 3 reasons why it is taking off" Dec. 2019 issue of International Mining, https://new.abb.com/mining/mineoptimize/systems-solutions/mining-electrification/trolley-assist-for-diesel-electric-trucks, @ Copyright 2021 ABB—Mining electrification and infrastructure (8 pages).

CAT "CAT Trolley Assist System For Ultr-Class Electric Drive Mining Trucks", © 2021 Caterpillar. (6 pages).

Mazumdar, The Case for Trolley Assist: High fuel prices are the main reason mine operators consider trolley assist for haul trucks, but safety and sustainability are also important considerations, www.womp-int.com/story/2011vol09/story024.htm, Womp 2011 vol. 09, Apr. 12, 2021, (4 pages).

First Examination Report mailed Mar. 10, 2022 for corresponding Australian Application No. 2021202231 (5 pages).

First Examination Report mailed May 27, 2022 for corresponding Indian Patent Application No. 202114016820 (6 pages).

Examination Report No. 2 mailed Jul. 5, 2022 for corresponding Australian Patent Application No. 2021202231.

First Office Action mailed Jul. 11, 2022 for corresponding Japanese Patent Application No. 2021-067194 (Machine translation provided).

Examination Report No. 3 mailed Oct. 25, 2022 for corresponding Australian Patent Application No. 2021202231.

Final Office Action mailed Jan. 25, 2023 for corresponding Japanese Patent Application No. 2021-067194 (12 pages).

Examiner's Requisition received for related CA Pat. App. No. 3,114,526 dated Jan. 24, 2023 (6 pages).

* cited by examiner

POWER SUPPLY SYSTEM AND METHOD

CROSS-REFERENCE TO RELATED APPLICATIONS

This application claims priority to U.S. Provisional Application No. 63/009,176, which was filed on 13 Apr. 2020, and the entire disclosure of which is incorporated herein by reference.

BACKGROUND

Technical Field

The subject matter described relates to systems and methods that deliver electric current to powered systems to power the powered systems.

Discussion of Art

Some powered systems are supplied with electric current from a remote location by conductive pathways. For example, some vehicles may have pantographs that contact overhead cables that supply direct current (DC) to the vehicles via the cables and pantographs. One type of these vehicles is mining vehicles operating in underground mines or open pit mines above ground, such as haul trucks. A power generating station (e.g., a power plant) can generate alternating current (AC) that is stepped up to relatively large voltages by one or more stationary transformers. This generated AC can be stepped up to 100 kV or more, such as 138 kV to 765 kV, or the like, and can have a frequency of 50 or 60 hertz (Hz). This high voltage, low frequency AC can be conducted via transmission lines (e.g., catenaries) to one or more off-board transformer substations within the mine that step down the high voltage, low frequency AC to a reduced voltage and/or increased frequency for transmission within the mine. As one example, this reduced voltage for transmission within the mine can be 11 kV or less and the increased frequency of the AC can be 50 to 60 Hz. These transformer substations are wayside transformers in that the transformers are all off-board the vehicles and do not move with the vehicles.

The reduced voltage, increased frequency AC is conducted via the transmission lines from the stationary wayside transformer substations to one or more off-board rectifiers. These rectifiers are wayside rectifiers that are not onboard any vehicles. For example, the rectifiers are stationary and do not move with the vehicles. The rectifiers convert the reduced voltage, increased frequency AC to DC, such as 1.8 kV to 2.4 kV DC, that is conducted via the transmission lines to pantographs of the vehicles. The vehicles receive the DC from the transmission lines and power traction motors of the vehicles to propel the vehicles.

One problem with this type of power supply system is the need for the off-board, stationary, wayside step down transformers and off-board, stationary, wayside rectifiers that condition or alter the AC conducted along the transmission lines to a DC waveform that can be used by the vehicles. The AC currently conducted along the transmission lines cannot be used by at least some known mining vehicles. Moreover, the AC conducted via the transmission lines can restrict what electronic components can be coupled between the motors of a vehicle and the transmission lines. Because the frequency and peak voltage of the AC conducted in the transmission lines is fixed (e.g., controlled by an external source, such as a power generation station), the electronic components that can receive the AC from the transmission lines are restricted to certain electronic components. The electronic components that receive the AC and modify the AC for use by the motors typically may not be simply switched out with other electronic components due to the fixed frequency and peak voltage of AC provided by the external source. It may be desirable to have a system and method that differs from those that are currently available.

BRIEF DESCRIPTION

In one embodiment, a power supply system includes an onboard rectifier configured to be disposed onboard a vehicle. The onboard rectifier may receive an alternating current conducted from a power generating station via a transmission line at a frequency that is at least that of a utility power line frequency. The onboard rectifier may change the alternating current into a direct current and to output the direct current to an electric propulsion system of the vehicle to power the propulsion system and propel the vehicle.

In one embodiment, a method is provided that includes receiving an alternating current at an onboard rectifier disposed onboard an electric vehicle. The alternating current is received by the onboard rectifier from a power generating station via a transmission line and at a frequency that is at least a utility power line frequency. The method also includes changing the alternating current into a direct current using the onboard rectifier and supplying the direct current from the onboard rectifier to an electric propulsion system of the vehicle to power the propulsion system and propel the vehicle.

In one embodiment, a method includes receiving an alternating current at a frequency of at least fifty Hz onboard an electric vehicle from a power generating station via one or more transmission lines, rectifying the alternating current into a direct current onboard the electric vehicle, and powering a propulsion system of the electric vehicle using the direct current to power the propulsion system and propel the electric vehicle.

In one embodiment, a method is provided that includes conducting an alternating current at a power utility line frequency from a power generating station via one or more transmission lines, receiving the alternating current at a rectifier onboard a vehicle without the alternating current being rectified off-board the vehicle between the power generating station and the vehicle, rectifying the alternating current onboard the vehicle to generate a direct current, and powering one or more electric traction motors of the vehicle using the direct current.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to power supply systems and methods that supply electric current to a vehicle from a remote location to power the vehicle. The systems and methods can be used to power electric motors of vehicles to propel the vehicles.

Suitable vehicles may be mining vehicles, such as haul trucks, in one embodiment. Not all embodiments of the inventive subject matter described herein, however, is limited to powering mining vehicles. For example, the vehicles described herein can represent transit vehicles, such as trolley vehicles, electrically powered buses, automobiles, or the like. At least one embodiment of the inventive subject matter described herein may be used in connection with supplying electric power to non-vehicular powered systems.

Figure 1:
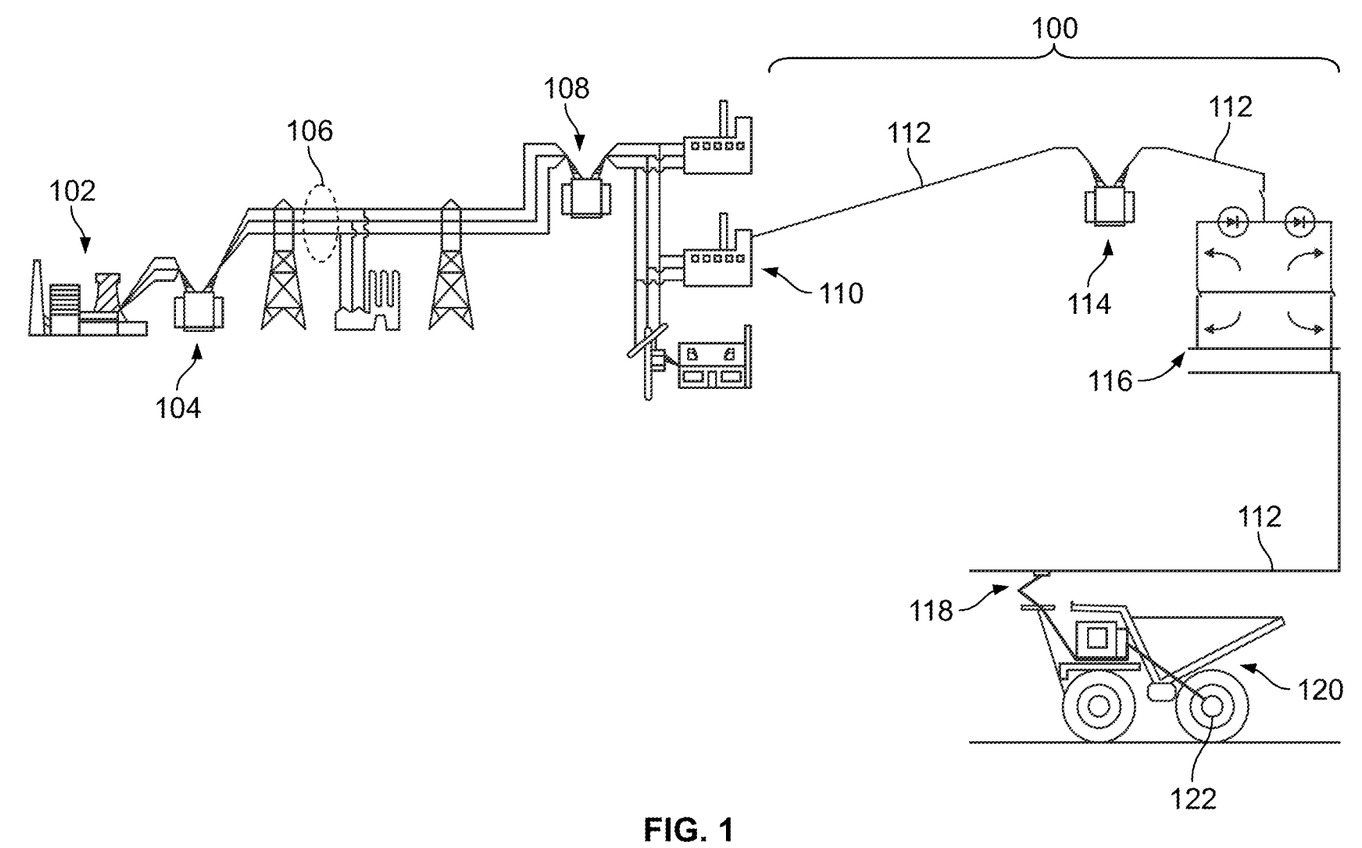
FIG. 1 illustrates one example of a power supply system.

FIG. 1 illustrates one example of a power supply system 100. The power supply system may be less desirable than one or more embodiments of other power supply systems described herein due to the requirement for one or several off-board, stationary wayside transformers and/or rectifiers. As shown, the power supply system is conductively coupled with a power generating station 102 by a generating step up transformer 104, one or more conductive transmission lines 106 (e.g., cables, wires, or the like), one or more step down transformers 108, and one or more customer stations 110.

In the illustrated embodiment, the power generating station is a power plant that generates AC at voltages greater than 4 kV. In other embodiments, the voltages can be in a range of less than about 6 kV, in range of from about 6 kV to about 6.5 kV, in a range of from about 6.6 kV to about 10 kV, in a range of from about 10 kV to about 20 kV, in a range of from about 21 kV to about 22 kV. In various embodiments, suitable AC voltages may be selected from 11 kV, 13 kV, and 7.200 kV. In other embodiments, the voltages can be relatively smaller, such as 4.160 kV, 7.200 kV, or the like. The voltages may be selected with reference to application specific parameters and may not be substitutable in all applications.

This generated AC may be conducted to the generating step up transformer where the voltage of the generated AC is increased. In one embodiment, the voltage may be increased to 100 kV or more (e.g., 138 kV to 765 kV). This high voltage AC may be conducted via one or more of the transmission lines to one or more of the step down transformers. The step down transformers may reduce the voltage of the AC. In one embodiment, the step down is to a voltage in a range of from about 4 kV to 14 kV. The stepped down AC may be conducted to the customer station. Suitable customer stations may be, for example, an electrical substation dedicated to supplying AC to a mine to power vehicles moving within the mine. The customer station then directs the stepped down AC into one or more conductive transmission lines 112 of the power supply system within the mine.

The AC that is conducted within the transmission lines in the mine may be at relatively high voltages. The frequency of the AC that is conducted within the transmission lines in the mine may be controlled to be, or restricted to, the frequency of the AC that is conducted from outside of the mine. In one example, the frequency of the AC conducted into the transmission lines from the customer station may be one of 50 Hz or 60 Hz as the frequency of the AC conducted to the customer station from the power generating station via the transmission lines also may have a frequency of 50 Hz or 60 Hz.

Within the mine, the power supply system may include one or more stationary, off-board wayside transformers 114 that receive the stepped down AC from the customer station. The stationary, off-board wayside transformers further step down (e.g., reduce) the voltage of the AC conducted along the transmission lines of the power supply system. The power supply system may include one or more stationary, off-board wayside rectifiers 116. These rectifiers may convert the AC with the stepped down voltage to DC. Suitable stepped down voltage may be in a range of from about 1.8 kV to 2.4 kV DC. Although only a single transformer and a single rectifier are shown in FIG. 1, several of the transformers and rectifiers can be provided, especially where the transmission lines are long. For example, the transformers and rectifiers may be spaced apart at a regular, repeating separation distance along the transmission lines.

Each of the transmission lines may need to have a relatively large diameter (e.g., a low gauge) due to the peak voltages and frequencies of the AC current that is conducted through the transmission lines. In one embodiment, a suitable transmission line may be dual (in parallel) 150 mm2 copper lines. Some systems may have additional aluminum or copper feeder cables that do not directly contact pantographs of vehicles, but that extend along poles to decrease losses from dry drop of effective resistance. An example infrastructure system may have two 150 mm2 copper lines and three 454 mm2 aluminum lines that extend parallel on the pole and jumpers. Smaller (e.g., larger gauge) transmission lines may not be able to conduct AC having this large of a peak voltage and/or this high of a frequency throughout a mine or other area.

This stepped down DC may be conducted along the transmission lines within the mine to pantographs or other current collectors 118 onboard vehicles 120 within the mine. (The current collector is a pantograph, sliding shoe, or other device onboard a vehicle for conducting electrical power between a stationary off-board source and the vehicle when the vehicle is moving.) Although only a single vehicle is shown, several vehicles may concurrently receive DC from the rectifiers via the transmission lines. These vehicles can be mining vehicles or other vehicles having a propulsion system (e.g., electric traction motors 122) conductively coupled with the pantographs of the vehicles. The vehicles may have auxiliary loads in addition to the propulsion system. Suitable auxiliary loads may include power tools, heating and cooling, power take off, communication systems, and the like. The traction motors may be powered by the DC received from the transmission lines of the power supply system to propel the vehicles. Suitable vehicles may have battery packs that may be charged from the pantographs. The traction motors may be powered directly (via power electronics) from the transmission lines, indirectly from the battery pack, or selectively from either or both the battery pack and the transmission line. In one embodiment, another source of electricity may be present for propulsion and/or the aux load. Suitable additional electricity sources may include a fuel cell.

Several stationary, off-board wayside transformers and the several stationary, off-board wayside rectifiers may increase a cost and complexity of a power supply system relative to a power supply system that does not include the stationary, off-board wayside transformers and/or the several stationary, off-board wayside rectifiers.

Figure 2:
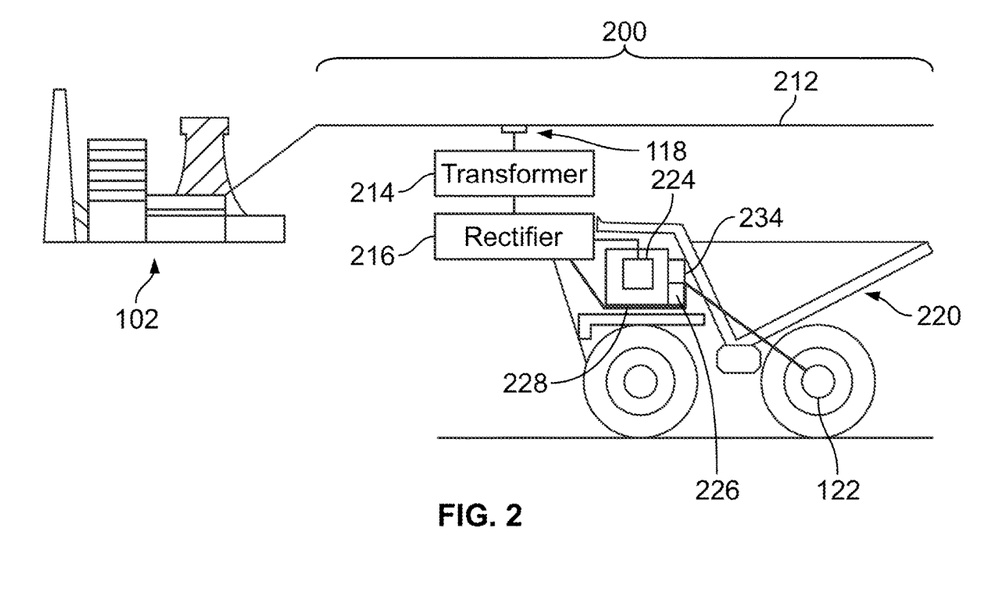
FIG. 2 illustrates another example of a power supply system.

FIG. 2 illustrates another example of a power supply system 200. The power supply system differs from the power supply system shown in FIG. 1 in several ways. As one example, the power supply system does not include several off-board, stationary wayside transformers or several off-board, stationary rectifiers. The system may include one or more transmission lines 212. Suitable transmission lines may include conductive pathways. Suitable conductive pathways may include one or more of catenaries, cables, wires, electrified third rails, and the like. The power supply system may include at least one onboard, mobile transformer 214 and/or at least one onboard, mobile rectifier 216. The transformer and/or the rectifier may be onboard an electric vehicle 220 in that the transformer and/or rectifier may be coupled with and/or supported by the vehicle and move with the vehicle as the vehicle moves. Suitable vehicles may include trolleys, agricultural equipment, mining equipment, passenger vehicles, industrial equipment, and the like.

In the illustrated embodiment, the vehicle includes both an onboard transformer and an onboard rectifier. As described below, however, the vehicle may not include the onboard transformer. The power supply system may be entirely disposed within the outer boundary of an above-ground mine or an inground mine. In various embodiments, one or more transmission lines may extend above, along, or beneath paths on which the vehicle can move within the mine. Alternatively, the power supply system may be partially or entirely disposed outside of a mine. The power supply system may power the traction motor(s) of the vehicle via the onboard transformer and/or onboard rectifier to propel the vehicle within the mine.

While electrified load haul trucks moving in a mine may be powered via overhead catenaries and pantographs on the trucks, not all embodiments are limited to this arrangement. The transmission lines may be electrified rails that power rail vehicles, trolleys, or the like. The vehicles may be rail vehicles, trolleys (that carry passengers or other cargo), or the like.

A controller 224 of the vehicle may include hardware circuitry that includes and/or is connected with one or more processors (e.g., one or more microprocessors, integrated circuits, field programmable gate arrays, etc.) that control operation of the vehicle as described herein. The controller can control operation of the onboard rectifier by generating and sending control signals to switches of the onboard rectifier (described herein) to control whether AC obtained from the transmission line(s) is converted by the onboard rectifier into DC current for powering the traction motor(s). The controller may receive for controlling movement of the vehicle, such as changes in a throttle setting (e.g., by changing a position of a lever, pedal, etc.). This input can be provided by an operator onboard the vehicle, by the controller or other system autonomously controlling movement of the vehicle, from a dispatch system off-board the vehicle, an operator off-board the vehicle, etc. A suitable controller may include wireless transceiving hardware (e.g., antennas, modems, etc.) for receiving control signals from a remote location (e.g., an operator disposed off-board the vehicle) for remotely controlling operation of the vehicle.

In operation, multi-phase AC may be conducted from the power generating station into the transmission lines of the power supply system. The transmission line shown in the plan view of FIG. 2 can represent multiple transmission lines, with each transmission line conducting a different phase of AC from the power generating station to the vehicle(s). For example, there may be three transmission lines each conducting a different phase of three-phase AC from the power generating station. Alternatively, two-phase, four-phase, or the like, AC may be conducted to the vehicle from the power generating station via the same number of transmission lines.

This AC may be directly received by the vehicle from the transmission lines. For example, instead of the vehicle receiving DC current from the transmission lines like the vehicle in the example of FIG. 1, the vehicle may receive AC from the transmission lines. This AC is not rectified by any off-board rectifiers, but is conducted into the onboard transformer of the vehicle as AC. The onboard transformer of the vehicle can step down (e.g., reduce) the voltage of the AC. For example, the power generating station may output AC onto, through, or via the transmission lines having a peak voltage. In another embodiment, the voltage may be controlled to be between a positive (or upper) peak and a negative (or lower) peak of the AC waveform. When using a peak voltage, a suitable peak voltage may in at least 4 kV in one embodiment. In another embodiment, the peak voltage may be at least 10 kV. In another embodiment, the peak voltage may be at least 11 kV. In yet other embodiment, the peak voltage may be at least 13 kV. In some embodiments, the voltage may be selected such that the peak voltage is less than a voltage at which a transmission line might fail or overheat. Optionally, the peak voltage may in a range of from about 4 kV to about 25 kV. Selection of a peak voltage may be made with reference to application specific parameters. These parameters may include one or more of the electric current, the gauge of wire, the end use application, the duration of the load, the load ramp rate, environmental factors, electrical supply factors, and the like.

Increased voltages may pose a safety hazard to operators, when the connection of the vehicle to the neutral line (of the power supply system) is lost the disconnection of the vehicle to the neutral line may cause the reference voltage of the vehicle to float to undesirable or relatively high voltages. For example, the body and/or chassis of the vehicle may be at a high potential or voltage due to the voltage provided via the transmission lines. In one embodiment, the vehicle may contact the transmission line and/or receive voltage via the transmission line only while the vehicle is moving. The system may be configured such that operators may not be able to touch the vehicles while moving (by rule, regulation, or ability to reach the vehicles).

In one embodiment, the transformer that supplies the current to the transmission lines may include a center tap. This center tap may reduce the float of the vehicle (e.g., the voltage or potential of the vehicle body or chassis when disconnected from the neutral line) relative to no center tap being present. For example, the center tap may cut or reduce the maximum voltage or potential of the vehicle body or chassis in half (relative to a transformer that does not include the center tap).

Additionally or alternatively, the vehicle may include a switch (e.g., such as a contactor, a circuit breaker, or the like)

that may open and disconnect the vehicle from the transmission line responsive to detecting that the vehicle is no longer connected to a neutral line. For example, the vehicle may have multiple (e.g., two) current collectors in contact with the transmission lines. Each of these current collectors may receive a single phase AC from a different transmission line. If the voltage from either single phase AC to a reference (e.g., the chassis of the vehicle or the earth ground for the power supply system) does not exceed a designated threshold within a designated time period. A suitable designated threshold may be 40 V or another value. In one example, the designated time period may be 1/f, where f is the fundamental power frequency of the AC. The voltage to reference may be measured as an amplitude (e.g., the voltage of the positive or negative peak of the AC), root mean square value of the voltage of the AC, or a direct reading of the voltage of the AC. The switch may open responsive to the measured voltage exceeding the threshold within the designated time period.

Additionally or alternatively, a controller may operate the system so that a maximum voltage permitted to be conducted via the transmission lines may be limited to a value that tires of the vehicle may insulate and prevent from being conducted to the ground (in the event of a ground fault where one of the power conductors is shorted to the ground reference of the vehicle). The smallest tire size for the vehicles may be used to calculate the maximum voltage permitted to be conducted from the transmission lines to the vehicle. For example, the smallest tires of the vehicle that may be connected with the transmission lines may have a radius of sixty inches but with a fifty-seven inch diameter conductive rim and a 31.5 inch path between the chassis and the earth ground reference. A standard voltage creep for the environment in which the vehicles operate (e.g., the distance that various voltages may jump or be transmitted between) may be three inches per 2 kV and the air gap or voltage jump across air gaps may be approximately one inch per 2 kV. The system may assume a conservative limit such that there is a thirty inch straight distance or profile between the conductive portion of the vehicle (e.g., the rim) and the surface on which the tires of the vehicle are moving. With the standard voltage creep and air gap, the system may calculate and direct that the voltage on the transmission line may be limited to 20 kV. This limit may prevent or reduce the likelihood of the voltage in the vehicle body or chassis jumping to the surface in case of a ground fault, which can reduce or eliminate the likelihood of damage to tires of the vehicle and/or nearby components (e.g., due to fire caused by arcing).

The AC may be conducted in the transmission lines from the power generating station at a frequency that is based at least in part on a utility power line frequency. For example, the AC may be conducted from the power generating station at frequencies that are conducted onto a power grid for consumer use, such as 50 to 60 Hz. Alternatively, the frequency of the AC conducted from the power generating station and into, through, and/or via the transmission lines may be less than 50 Hz. Alternatively, the frequency of the AC conducted from the power generating station and into, through, and/or via the transmission lines may be greater than 60 Hz and no more than 1 kHz. Alternatively, the frequency of the AC conducted from the power generating station and into, through, and/or via the transmission lines may be at least 1 kHz and no more than 5 kHz. Alternatively, the frequency of the AC conducted from the power generating station and into, through, and/or via the transmission lines may be at least 5 kHz and no more than 6 kHz. Alternatively, the frequency of the AC conducted from the power generating station and into, through, and/or via the transmission lines may be a low frequency, such as less than 50 Hz.

The onboard transformer may receive the multi-phase AC from the transmission lines and step down the voltage of the multi-phase AC. For example, the onboard transformer may be a delta-wye transformer having delta-connected windings on a primary winding of the transformer and wye or star connected windings on the secondary winding of the transformer. Alternatively, the transformer may be another type of transformer. The transformer may reduce the peak voltages of the multi-phase AC and supply the reduced voltage, multi-phase AC to the onboard rectifier. For example, in various embodiments the transformer may reduce the peak voltages of the multi-phase AC from at least 4 kV, at least 10 kV, at least 11 kV, or at least 13 kV to 1.8 kV, 2.4 kV, or between 1.8 kV and 2.4 kV. The reduced voltage, multi-phase AC may be conducted from the onboard transformer to the onboard rectifier.

The onboard rectifier may then convert the multi-phase AC into DC that may be supplied to a variable frequency drive (VFD) 226. The VFD may include one or more inverters that convert the DC received from the onboard rectifier into AC. The VFD control the frequency of the AC using the one or more inverters to control the speed at which the motor(s) operate. For example, the controller may direct the VFD to generate the AC at different frequencies depending on a desired speed or torque output of the traction motor(s). The controller may direct the VFD to generate AC with higher frequencies to increase the rotational speed of and/or torque output by the traction motor(s). Powering the VFD with the DC from the onboard rectifier allows the vehicle to operate at different speeds and/or torque outputs at different times.

Placing the transformer and rectifier onboard the vehicle may reduce the cost and complexity of the power supply system. For example, because the transformer and rectifier move with the vehicle, the need to place several off-board, stationary transformers and rectifiers in multiple, spaced apart locations along the transmission lines may be reduced or eliminated. The voltage received by the transformer and rectifier onboard the vehicle may drop by the ratio of transformer turns (e.g., of the coils in the transformer), so the current increases by the ratio of transformer turns. The contact and feeder wires of the overhead line may need to be sized based on a current rating. Therefore, if the voltage stays at 10 kV to transmit 5 MW of power, the line may be sized for 500 amps (RMS). If the voltage is dropped to traditional DC overhead line voltages of 1400 to 2600 V (DC) to transmit 5 megawatts, the lines may need to be sized for 3500 amps to 1900 amps, respectively.

In another embodiment, a single phase AC is conducted from the power generating station into a single transmission line or each of multiple transmission lines of the power supply system. This single-phase AC may be directly received by the pantograph of the vehicle from the transmission line(s). This single phase AC is not rectified by any off-board rectifiers, but is conducted into the onboard transformer of the vehicle as single phase AC. The onboard transformer of the vehicle can step down (e.g., reduce) the voltage of the single phase AC. For example, the transmission lines may conduct the single phase AC from the power generating station having a peak voltage of at least 4 kV. In other embodiments the peak may be in a range of at least about 10 kV to about 13 kV. Depending on the end use application the peak value may be selected to be a voltage less than that at which the transmission lines would fail or overheat. The AC current may be conducted in the transmission lines from the power generating station at low frequencies. Suitable low frequencies may be in a range of about 50 Hz, about 60 Hz, or the like.

The onboard transformer can receive the single phase AC from the transmission line and step down the voltage of the single phase AC. The transformer can supply the reduced voltage, single phase AC to the onboard rectifier. For example, the transformer can reduce the peak voltages of the single phase AC from at least 4 kV. In other embodiments the reduction is from at least 10 kV or at least 11 kV. In other embodiments, the reduction may be from at least 13 kV to about 1.8 kV. The reduced voltage, single phase AC may be conducted from the onboard transformer to the onboard rectifier. The onboard rectifier may then convert the single phase AC into DC that is supplied to the VFD. The VFD may generate AC having a frequency that is controlled by the controller to drive a traction motor.

In one embodiment, the power supply system may include an energy storage device 234. A Suitable energy storage device can have one or more re-chargeable batteries that can receive at least part of the DC output by the onboard rectifier. The energy storage device may store electric energy from the DC bus. This DC current may be used to power one or more auxiliary devices (e.g., devices that do not operate to propel the vehicle) and/or to power the motor(s) via the VFD. Alternatively, the energy storage device may include one or more fuel cells, capacitors (e.g., super- or ultra-capacitors), flywheels, compressed air containers, electrolyzers, and the like.

The AC conducted through or via the transmission lines may have a frequency different from those frequencies described above. For example, instead of having a low frequency of 50 to 60 Hz, the AC conducted into the transmission lines by the power generating station may have a frequency of at least 4 kHz. In another embodiment, the frequency of the AC may be at least 5 kHz. In another embodiment, the frequency of the AC may be at least 6 kHz. Optionally, the frequency of the AC may be in a range of from about 1 kHz and 10 kHz. Higher frequency AC conducted through the transmission lines can allow for the size and weight of the onboard transformer relative to lower frequency AC conducted through the transmission lines, while receiving the same (or greater) power density from the transmission lines. For example, an AC frequency of 5 kHz can increase the power density of the AC received by the onboard transformer relative to smaller frequencies. The use of a smaller, lighter transformer can reduce the weight and size of the vehicle on which the onboard transformer is carried. This can allow for the vehicle to haul greater amounts of cargo or mass relative to vehicles carrying larger and/or heavier onboard transformers.

Figure 10:
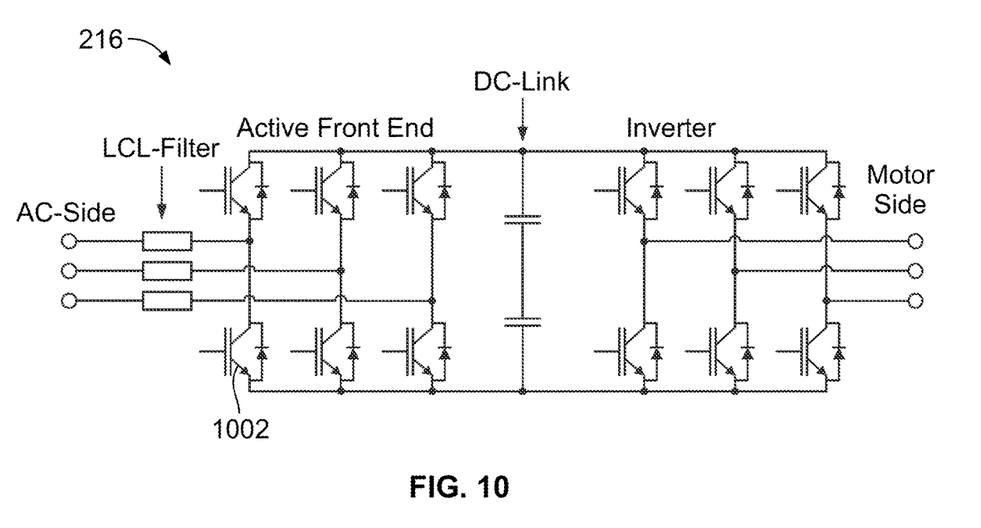
FIG. 10 is a schematic diagram illustrating an embodiment of an onboard rectifier.

In one embodiment, the onboard rectifier includes switches that are controlled (by the onboard rectifier and/or by the controller) to convert the stepped down AC received from the onboard transformer into DC to power the motor(s). These switches can be semiconductor switches, such as doped silicon semiconductor switches. Alternatively, the switches can be semiconductor switches that have higher performance than doped silicon semiconductor switches. For example, the switches in the rectifier may operate to control the conduction of AC through the rectifier with smaller losses than doped silicon switches, such as silicon carbide (SiC) switches, gallium nitride (GaN) switches, or the like. FIG. 10 illustrates one example of the onboard rectifier. As shown, the onboard rectifier can include switches 1002 that are controlled (by the onboard rectifier and/or by the controller) to convert the stepped down AC received from the onboard transformer (e.g., via "AC-Side" in FIG. 10) into DC to power the motor(s) (e.g., via "Motor Side" in FIG. 10). Suitable switches can be semiconductor switches. Suitable semiconductor switches may include doped silicon semiconductor switches, gallium nitride semiconductor switches, and silicon carbide semiconductor switches. A suitable rectifier can receive three phase AC (as shown in FIG. 10 by the three AC-Side inputs), or can be selected to receive six, twelve, eighteen, twenty-four phase AC. Selection can be made based on application specific parameters.

Figure 3:
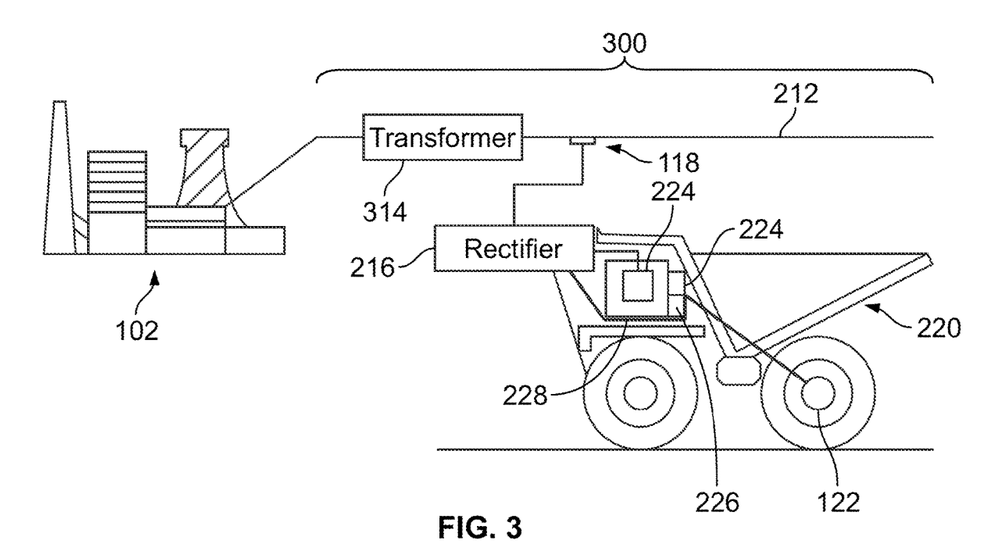
FIG. 3 illustrates another example of a power supply system.

FIG. 3 illustrates another example of a power supply system 300. The power supply system 300 differs from the power supply system shown in FIG. 2 in that the vehicle does not include an onboard transformer between the transmission line(s) and the onboard rectifier. Instead, one or more stationary, off-board, wayside transformers 314 may be coupled with or disposed along the transmission line. The wayside transformer(s) can step down the peak voltage of the AC conducted along or via the transmission line(s) before the AC is received by the onboard rectifier via the pantograph(s). The onboard rectifier can then convert the stepped down AC to DC current that is provided to the VFD for powering and controlling the motor(s) of the vehicle, as described above. Because the vehicle still have the VFD, the vehicle can move at different speeds responsive to the VFD changing the frequency of the AC that is output by the VFD to the motor(s). Removing the onboard transformer (shown in FIG. 2) from the vehicle and using the off-board transformer(s) 314 may add to the cost of the power supply system but can reduce the weight carried by the vehicle. This can permit the vehicle to carry greater loads or cargo relative to one or more of the vehicles that carry the onboard transformers.

Figure 4:
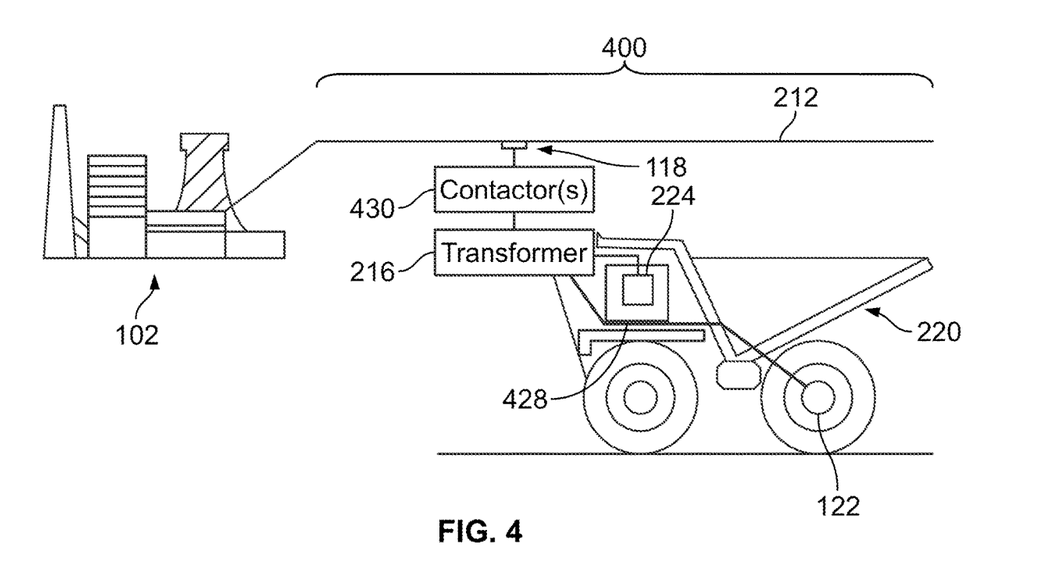
FIG. 4 illustrates another example of a power supply system.

FIG. 4 illustrates another example of a power supply system 400. This power supply system may include the onboard transformer described above but does not include the onboard rectifier described above. Instead, the power supply system includes one or more switches 430 disposed between the pantograph(s) of the vehicle and the onboard transformer. Suitable switches may include, for example, electro-mechanical contactors or relays, and/or they may include power transistors or other solid-state switching devices; in the drawings, the switches are shown as contactors, as an example. In one embodiment, the switch or switches include one or more 3-phase contactors.

The switches are operable to connect or interrupt a conductive connection between the pantograph(s) and the onboard transformer. The switches can be controlled by the controller to open or close. When the switches are open, AC conducted via the transmission line(s) from the power generating station may not be conducted through the pantograph(s) to the onboard transformer. As a result, the motor(s) may not be powered and may not propel the vehicle using the AC from the transmission line(s). When the switches are closed, AC conducted via the transmission line(s) from the power generating station is conducted through the pantograph(s) to the onboard transformer.

The onboard transformer may reduce the peak voltage of the AC received from the transmission line(s) before the AC is conducted to the traction motor(s) of the vehicle. The stepped down AC from the onboard transformer can be conducted via one or more conductive pathways 428 onboard the vehicle (e.g., cables, wires, buses, etc.) to the traction motor(s). The traction motor(s) may be electrically powered by the stepped down AC to propel the vehicle. Because the frequency of the AC conducted on the transmission line(s) and stepped down by the onboard transformer is not modified, the traction motor(s) may be limited to operating at a single speed that corresponds to this frequency. For example, because the frequency of the AC does not change, the traction motor(s) may rotate wheels of the vehicle at a fixed or unchanging speed.

As shown in FIG. 4, the power supply system may not include a rectifier (onboard or off-board) between the power generating station and the vehicle. For example, no rectifiers may change the AC (or any part of the AC) to DC between the power generating station and the motor(s) of the vehicle.

Figure 5:
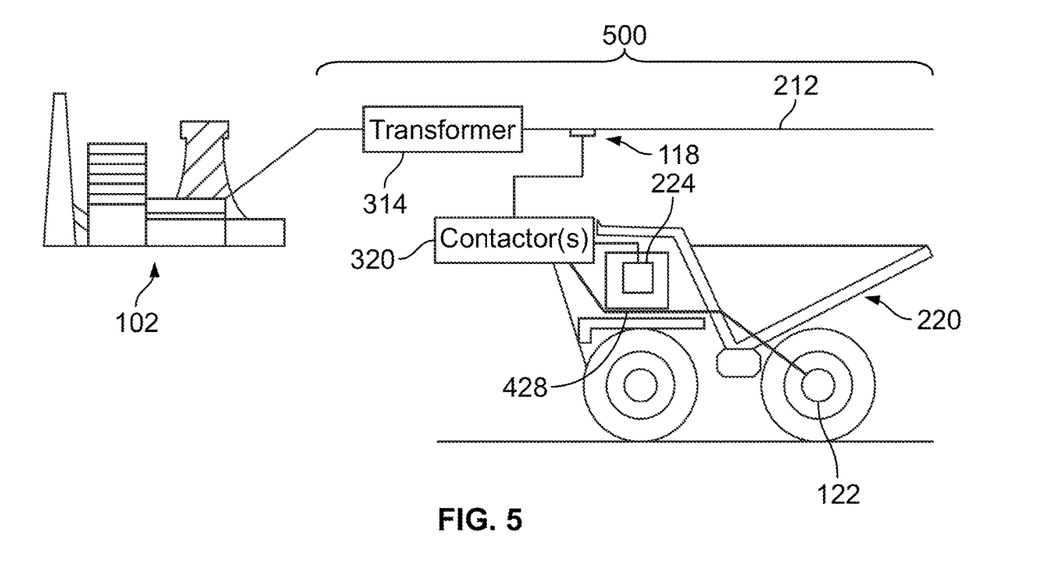
FIG. 5 illustrates another example of a power supply system.

FIG. 5 illustrates another example of a power supply system 500. This power supply system differs from the other power supply systems in that the power supply system does not include any onboard transformer or onboard rectifier. Additionally, the power supply system may include one or more of the off-board transformers that reduce, or step down, the peak voltage of the AC provided by the power generating station. The off-board transformer(s) may reduce the peak voltage to a level that can be used to directly power the traction motor(s) of the vehicle. The stepped down AC may be conducted to the vehicle via the transmission line(s) and the pantograph(s). The controller can control the conduction of the stepped down AC from the transmission line(s) and the pantograph(s) to the motor(s) using the contactors or other switches, as described above.

The stepped down AC received from the transmission line(s) can be conducted via the conductive pathways onboard the vehicle to the traction motor(s). The traction motor(s) can then be electrically powered by the stepped down AC to propel the vehicle. Because the frequency of the AC conducted on the transmission line(s) and stepped down by the onboard transformer is not modified, the traction motor(s) may be limited to operating at a single speed that corresponds to this frequency. For example, because the frequency of the AC does not change, the traction motor(s) may rotate wheels of the vehicle at a fixed or unchanging speed. In one embodiment, the power supply system may not include any rectifiers (onboard or off-board) between the power generating station and the vehicle. For example, no rectifiers may change the AC (or any part of the AC) to DC between the power generating station and the motor(s) of the vehicle.

Figure 6:
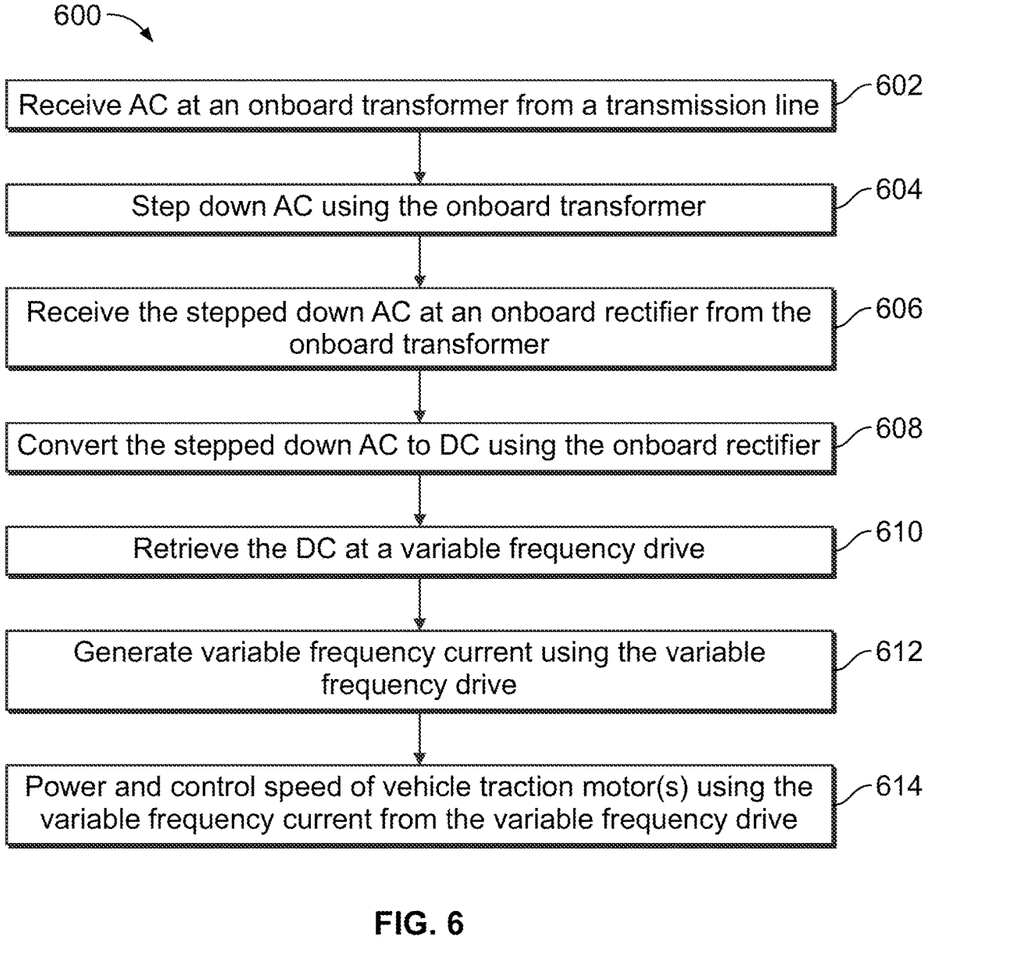
FIG. 6 illustrates a flowchart of one embodiment of a method for supplying electric power to motor(s) of a vehicle to power the motors.

FIG. 6 illustrates a flowchart of one embodiment of a method 600 for supplying electric power to motor(s) of a vehicle to power the motors. The method describes operation of one or more of the power supply systems described herein. For example, the method describes operation of the power supply system shown in FIG. 2. At step 602, AC is received at a transformer onboard a vehicle from one or more transmission lines and via one or more conductive bodies, such as one or more pantographs. Optionally, a brush, conductive show, or other conductive body can be used. At step 604, the peak voltage of the AC is stepped down by the onboard transformer. At step 606, the stepped down AC is received at a rectifier that also is disposed onboard the vehicle. At step 608, the onboard rectifier changes the stepped down AC to DC. At step 610, the DC output by the rectifier is received at a variable frequency drive. At step 612, the variable frequency drive generates a variable frequency current (e.g., AC having a frequency that can change based on control by the variable frequency current). At step 614, this variable frequency current is supplied to one or more electric traction motors (e.g., the motors) of the vehicle to power and control the speed of the motors. The speed of the motors can be controlled by changing the frequency of the variable frequency current.

Figure 7:
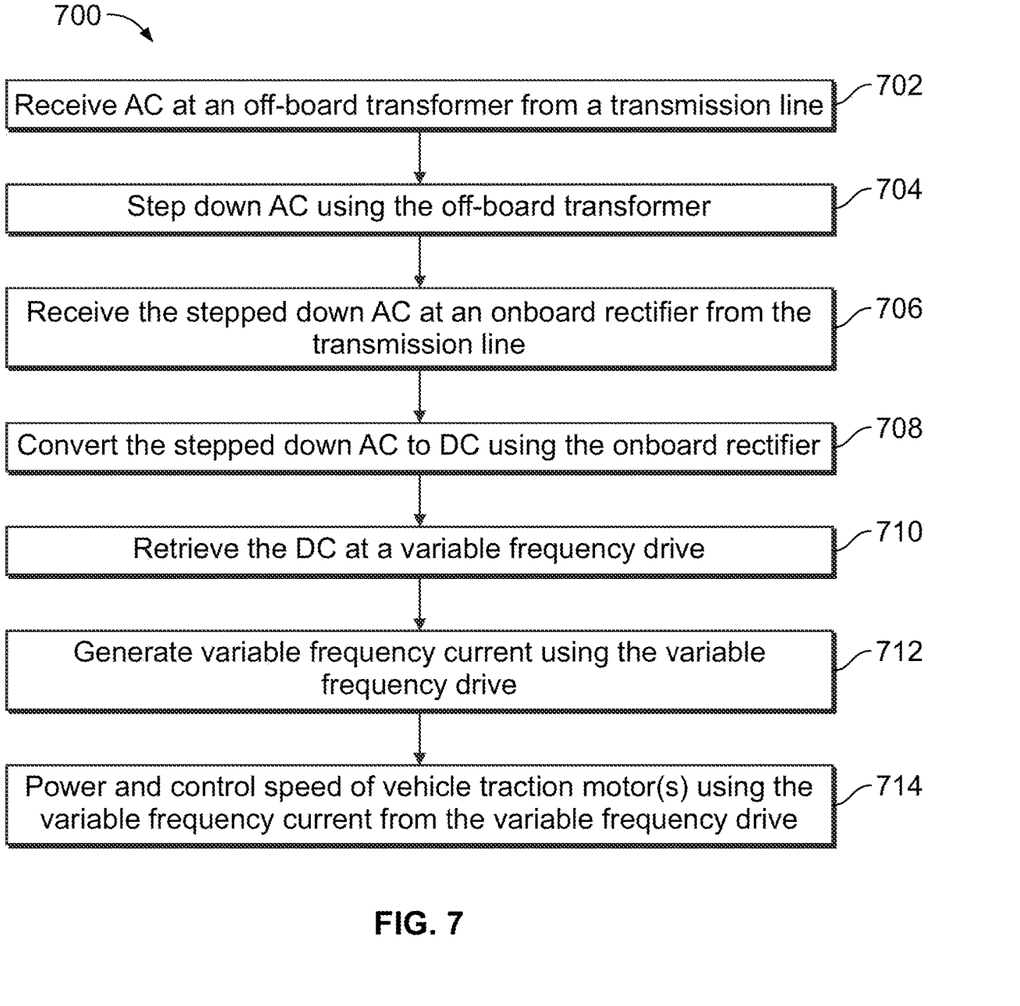
FIG. 7 illustrates a flowchart of one embodiment of another method for supplying electric power to motor(s) of a vehicle to power the motors.

FIG. 7 illustrates a flowchart of one embodiment of another method 700 for supplying electric power to motor(s) of a vehicle to power the motors. The method describes operation of one or more of the power supply systems described herein. For example, the method describes operation of the power supply system shown in FIG. 3. At step 702, AC is received at a transformer that is off-board a vehicle. The off-board transformer can receive the AC from one or more transmission lines. At step 704, the peak voltage of the AC is stepped down by the off-board transformer. This stepped down AC can be conducted back into the transmission line(s) and conducted toward one or more vehicles. At step 706, the stepped down AC is received at a rectifier that also is disposed onboard the vehicle. The stepped down AC can be received by the rectifier via one or more conductive bodies of the vehicle, such as pantographs, brushes, conductive shoes, or the like. At step 708, the onboard rectifier changes the stepped down AC to DC. At step 710, the DC output by the rectifier is received at a variable frequency drive. At step 712, the variable frequency drive generates a variable frequency current (e.g., AC having a frequency that can change based on control by the variable frequency current). At step 714, this variable frequency current is supplied to one or more electric traction motors (e.g., the motors) of the vehicle to power and control the speed of the motors. The speed of the motors can be controlled by changing the frequency of the variable frequency current.

Figure 8:
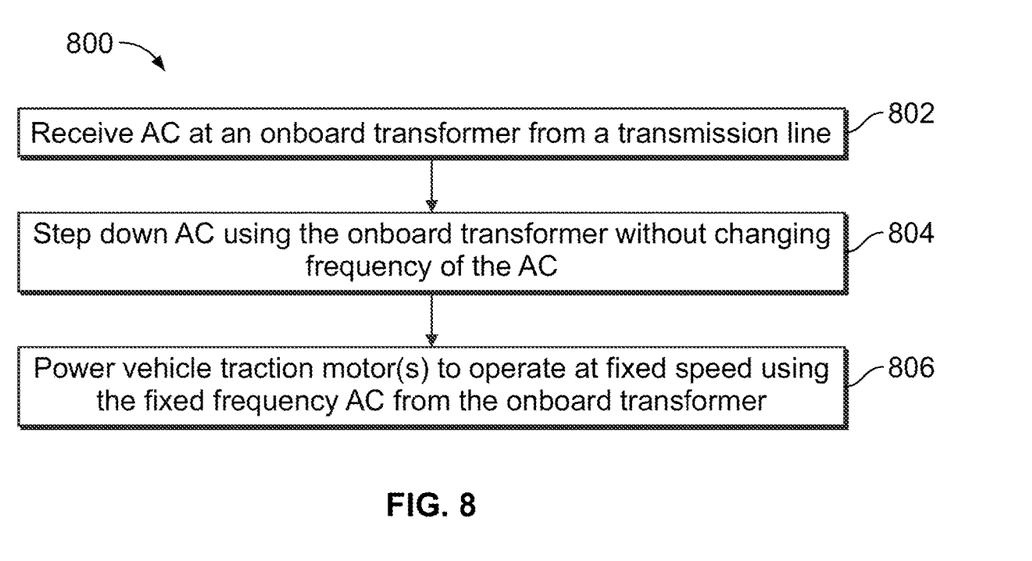
FIG. 8 illustrates a flowchart of one embodiment of another method for supplying electric power to motor(s) of a vehicle to power the motors.

FIG. 8 illustrates a flowchart of one embodiment of another method 800 for supplying electric power to motor(s) of a vehicle to power the motors. The method describes operation of one or more of the power supply systems described herein. For example, the method describes operation of the power supply system shown in FIG. 4. At step 802, AC is received at a transformer that is onboard a vehicle from one or more transmission line(s). The AC can be received via one or more conductive bodies of the vehicle, such as pantographs, conductive shoes, brushes, etc. At step 804, the peak voltage of the AC is stepped down by the onboard transformer. The peak voltage can be stepped down without changing the frequency of the AC. At step 806, the stepped down AC can be conducted from the onboard transformer to the motor(s) of the vehicle. For example, the stepped down AC can be conducted to the electric motors of the vehicle without changing a frequency of the AC or converting the AC to DC. The fixed frequency AC can be conducted to the motor(s) to power the motor(s) to operate at a single speed, as described above.

Figure 9:
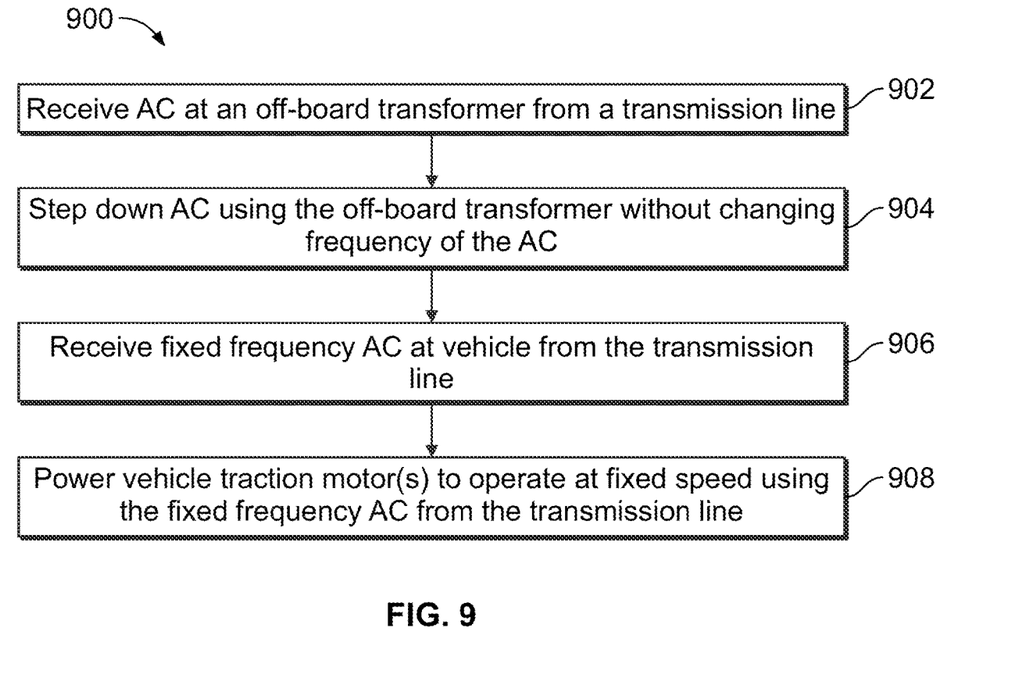
FIG. 9 illustrates a flowchart of one embodiment of another method for supplying electric power to motor(s) of a vehicle to power the motors.

FIG. 9 illustrates a flowchart of one embodiment of another method 900 for supplying electric power to motor(s) of a vehicle to power the motors. The method describes operation of one or more of the power supply systems described herein. For example, the method describes operation of the power supply system shown in FIG. 5. At step 902, AC is received at a transformer that is off-board a vehicle from one or more transmission line(s). At step 904, the peak voltage of the AC is stepped down by the off-board transformer. The peak voltage can be stepped down without changing the frequency of the AC. The stepped down AC can be conducted back into the transmission line toward the vehicle. At step 906, the fixed frequency, stepped down AC can be received by the vehicle from the transmission line(s). For example, AC can be received via one or more conductive bodies of the vehicle, such as pantographs, conductive shoes, brushes, etc. At step 908, the AC is conducted from the to the motor(s) of the vehicle. For example, the stepped down, fixed frequency AC can be conducted to the electric motors of the vehicle without changing a frequency of the AC or converting the AC to DC. The fixed frequency AC can be conducted to the motor(s) to power the motor(s) to operate at a single speed, as described above.

Figure 11:
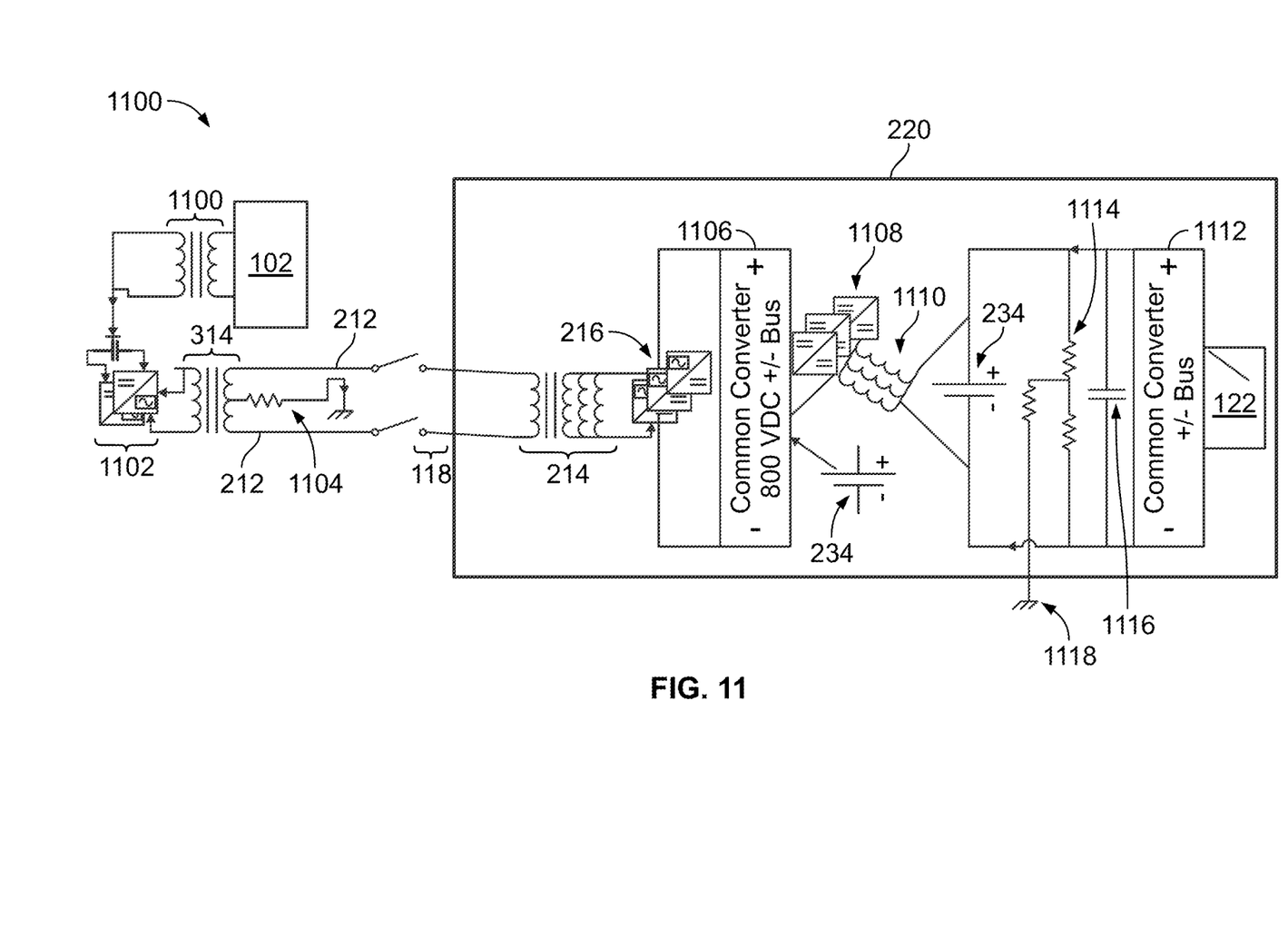
FIG. 11 illustrates another example of the power supply system shown in FIG. 2.

FIG. 11 illustrates another example of the power supply system similar to that shown in FIG. 2. The power supply system can include a wayside step down transformer that is off-board the vehicles and that receives AC from the power generating station. This transformer can receive 13 kV, three phase AC from the power generating station and step down this AC to 480 V, three phase AC (at 60 Hz frequency). Alternatively, the current can be stepped down to another voltage. This stepped down AC can be split and conducted via cables or other conductors to DC to AC converters. Suitable converters may be inverters, and may be switches that convert the AC received from the wayside transformer to a higher voltage (e.g., 12 to 25 kV), single phase AC. The wayside transformer can step down the voltage so that the switch can convert the AC to the higher voltage. This single phase AC may be conducted to the off-board transformer that is off-board the vehicles and that includes or is connected with a center tap.

In the illustrated embodiment, each of the two transmission lines conduct a single phase AC that is supplied to the vehicle via the current collector. The phases of the AC conducted in the transmission lines may be different. For example, the AC conducted in the transmission lines may have a 180 degree phase difference. In another embodiment, the AC may be 180 degrees out of phase. In another embodiment, the AC conducted in the transmission lines may have a phase difference that is not 180 degrees. Suitable phase differences may be selected based on application specific parameters, and, between the transmission lines, may influence or control the magnitude of voltage delivered to the vehicle via the current collector. For example, a 180 degree phase difference between the ACs may provide a large voltage to the vehicle, while a 90 degree phase difference may provide half of this largest voltage to the vehicle, no phase difference may provide no voltage or the smallest voltage to the vehicle, and so on.

The onboard transformer of the vehicle may receive the AC from the transmission lines via the current collector. This transformer can step down the voltage. In one example, the step down may be from about 25 kV AC to about 2.660 kV AC, or may be selected from other values based at least in part on the application. The voltage can be stepped down and conducted to the onboard rectifier. In the illustrated example, the onboard transformer includes three coils that separately conduct the single phase AC to three AC to DC rectifier as the onboard rectifier. Each of these rectifiers can include 1.7 kV silicon carbide diode rectifiers that convert the AC to DC. This DC is output by the rectifiers to a converter that is onboard the vehicle. The converter can be a DC to DC converter that changes the voltage of the DC received from the rectifiers. For example, the converter can reduce the voltage of the DC received from the rectifiers to a reduced voltage that can be used to charge the energy storage device that is coupled with the converter, as shown in FIG. 11.

The converter may connect with plural DC to DC converters such that each may change the voltage output by the converter. Each of these converters can be connected with a different inductor 1110, with the inductors coupled with another energy storage device. In one embodiment, the vehicle has either the energy storage device coupled with the converter or the energy storage device coupled with the inductors. Alternatively, the vehicle can have both the energy storage device coupled with the converter 6 and the energy storage device coupled with the inductors.

The inductors and/or energy storage device can be coupled with another converter 1112 with one or more legs having resistors 1114, capacitors 1116, ground connections 1118, etc., connected in parallel with the converter. The converter may change the voltage output by the inductors and/or energy storage device before supplying this voltage to the traction motors of the vehicle. The motors are powered by this voltage to propel the vehicle. In one embodiment, one or more of the energy storage devices can supply electric energy (e.g., DC) to the motors to power the motors. The vehicle may include an engine that operates with a generator or alternator onboard the vehicle to generate additional current for powering the motors. Alternatively, the vehicle may not include any engine.

While the description above focuses on the supply of current from off-board the vehicle to onboard the vehicle (to power the motors and/or charge the energy storage devices), the components shown in FIG. 11 may conduct current output by the motors back to the energy storage devices (for charging the energy storage devices) and/or back to the grid (e.g., the power generating station, which may be part of a utility grid). For example, during regenerative braking, the motors may generate DC that is conducted to the converter (where the voltage of the DC can be changed), then optionally to the energy storage device between the converter and the inductors, through the conductors to the other energy storage device (for charging) and/or the converters (for changing the voltage of the DC), to the rectifier (for being converted to AC), to the onboard transformer (for stepping up the voltage), to the off-board transformer via the current collector (for stepping down the voltage), to the inverters (for converting from AC to DC), then to the power generating station via the transformer.

In one embodiment, a power supply system includes an onboard rectifier configured to be disposed onboard an electric vehicle. The onboard rectifier is configured to receive an alternating current conducted from a power generating station via a transmission line at a frequency that is at least a utility power line frequency. The onboard rectifier is configured to change the alternating current into a direct current and to output the direct current to an electric propulsion system of the electric vehicle to power the propulsion system and propel the electric vehicle. Optionally, the onboard rectifier is configured to receive the alternating current at the utility power line frequency that is at least fifty hertz and no more than sixty hertz. Optionally, the onboard rectifier is configured to receive the alternating current at the frequency of at least five kilohertz, at least six kilohertz, or the like. Optionally, the onboard rectifier is configured to receive the alternating current at a peak voltage of at least ten kilovolts. Optionally, the system also includes an onboard transformer configured to be onboard the electric vehicle and to reduce a peak voltage of the alternating current. The onboard transformer can be configured to receive the alternating current from the transmission line and to output the alternating current with the peak voltage that is reduced to the onboard rectifier.

Optionally, the onboard rectifier includes one or more silicon carbide switches. Optionally, the onboard rectifier is configured to receive the alternating current from the power generating station without the alternating current being rectified by an off-board rectifier between the power generating station and the electric vehicle. Optionally, the onboard rectifier is configured to receive the alternating current as a single phase current. Optionally, the onboard rectifier is configured to receive the alternating current as a multi-phase current. Optionally, the system also includes a variable frequency drive configured to receive the direct current that is output by the onboard rectifier and to output a variable frequency current to the electric propulsion system of the electric vehicle. Optionally, the electric vehicle is a mining vehicle or a transit vehicle.

Optionally, the system also includes an energy storage device configured to be disposed onboard the electric vehicle and configured to store at least part of the direct current that is output by the onboard rectifier. In one embodiment, a method is provided that includes receiving an alternating current at an onboard rectifier disposed onboard an electric vehicle. The alternating current is received by the onboard rectifier from a power generating station via a transmission line and at a frequency that is at least a utility power line frequency. The method also includes changing the alternating current into a direct current using the onboard rectifier and supplying the direct current from the onboard rectifier to an electric propulsion system of the electric vehicle to power the propulsion system and propel the electric vehicle. Optionally, the alternating current is received at the utility power line frequency that is at least fifty hertz and no more than sixty hertz. Optionally, the alternating current is received at the frequency of at least five kilohertz.

Optionally, the alternating current is received at a peak voltage of at least ten kilovolts. Optionally, the method also includes receiving the alternating current at an onboard transformer from the transmission line and reducing a peak voltage of the alternating current using the onboard transformer prior to conducting the alternating current with the peak voltage that is reduced to the onboard rectifier. Optionally, the alternating current is received by the onboard rectifier from the power generating station without the alternating current being rectified by an off-board rectifier between the power generating station and the electric vehicle. In one embodiment, a method includes receiving an alternating current at a frequency of at least fifty Hz onboard an electric vehicle from a power generating station via one or more transmission lines, rectifying the alternating current into a direct current onboard the electric vehicle, and powering a propulsion system of the electric vehicle using the direct current to power the propulsion system and propel the electric vehicle.

Optionally, the alternating current is received at the frequency of at least five kilohertz. Optionally, the alternating current is received at a peak voltage of at least ten kilovolts. Optionally, the alternating current is received from the power generating station while not rectifying the alternating current off-board the electric vehicle. Optionally, the alternating current is received as a single-phase current. Optionally, the alternating current is received as a multi-phase current.

In one embodiment, a method is provided that includes conducting an alternating current at a power utility line frequency from a power generating station via one or more transmission lines, receiving the alternating current at a rectifier onboard a vehicle without the alternating current being rectified off-board the vehicle between the power generating station and the vehicle, rectifying the alternating current onboard the vehicle to generate a direct current, and powering one or more electric traction motors of the vehicle using the direct current.

In an embodiment, a power supply system includes an onboard rectifier configured to be disposed onboard an electric vehicle. The onboard rectifier is configured to receive an alternating current conducted from a power generating station via a transmission line at a frequency of from 50 hertz to 60 hertz, or at a frequency that is 50 hertz or greater (e.g., greater than 60 hertz). The onboard rectifier is configured to change the alternating current into a direct current, and to output the direct current to an electric propulsion system of the electric vehicle to power the propulsion system and propel the electric vehicle.

In an embodiment, an electric vehicle includes a chassis, a power supply system, and an electric propulsion system. One or more electric motors operably connected to one or more wheels, tracks, propellers, and the like. The power supply system and electric propulsion system are on-board the vehicle and connected to and supported by the chassis. The power supply system includes an onboard rectifier, an onboard transformer, and a current collector. The current collector is electrically connected to the transformer, and is configured to contact a transmission line while the vehicle is moving for conducting electricity from the transmission line to the transformer. An output of the transformer is electrically connected to the rectifier. The rectifier may receive an alternating current conducted from a power generating station via the transmission line, current collector, and transformer at a frequency that is 50 hertz or greater. The rectifier may change the alternating current into a direct current, and to output the direct current to the electric propulsion system of the electric vehicle to power the propulsion system and propel the electric vehicle. The transformer may reduce a peak voltage of the alternating current.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A power supply system comprising:
   an onboard rectifier configured to be disposed onboard a vehicle, the onboard rectifier configured to receive an alternating current conducted from a power generating station via one or more transmission lines, the onboard rectifier configured to change the alternating current into a direct current; and
   a controller configured control a maximum voltage permitted to be conducted via the one or more transmission lines and thereby to limit the maximum voltage to a determined value that is based at least in part on an insulation value of the vehicle relative to ground.

2. A power supply system comprising:
   an onboard rectifier configured to be disposed onboard a vehicle, the onboard rectifier configured to receive an alternating current conducted from a power generating station via one or more transmission lines at a utility power line frequency that is at least fifty hertz and no more than sixty hertz, the onboard rectifier configured to change the alternating current into a direct current, the onboard rectifier configured to output the direct current to an electric propulsion system of the vehicle to power the electric propulsion system and thereby to propel the vehicle; and
   a controller configured control a maximum voltage permitted to be conducted via the one or more transmission lines and thereby to limit the maximum voltage to a determined value that is based at least in part on an insulation value of the vehicle relative to ground.

3. The power supply system of claim 2, wherein the onboard rectifier is configured to receive the alternating current at a peak voltage of at least ten kilovolts.

4. The power supply system of claim 2, wherein the electric propulsion system is configured to generate additional direct current from dynamic braking and the onboard rectifier is configured to convert the additional direct current into additional alternating current that is conducted off the vehicle to the one or more transmission lines.

5. The power supply system of claim 2,, further comprising:
   an onboard transformer configured to be onboard the vehicle and to reduce a peak voltage of the alternating current, the onboard transformer configured to receive the alternating current from the one or more transmission lines and to output the alternating current with the peak voltage that is reduced to the onboard rectifier.

6. The power supply system of claim 2,, wherein the onboard rectifier includes one or more silicon carbide switches.

7. The power supply system of claim 2,, wherein the onboard rectifier is configured to receive the alternating current from the power generating station without the alternating current being rectified by an off-board rectifier between the power generating station and the vehicle.

8. The power supply system of claim 2,, wherein the onboard rectifier is configured to receive the alternating current as a single phase current.

9. The power supply system of claim 2,, wherein the onboard rectifier is configured to receive the alternating current as a multi-phase current.

10. The power supply system of claim 2,, further comprising a variable frequency drive configured to receive the direct current that is output by the onboard rectifier and to output a variable frequency current to the electric propulsion system of the vehicle.

11. The power supply system of claim 2,, further comprising one or more energy storage devices configured to receive the direct current from the onboard rectifier for charging the one or more energy storage devices, the one or more energy storage devices configured to discharge electric energy stored in the one or more energy storage devices to power one or more motors of the electric propulsion system of the vehicle to power the electric propulsion system and propel the vehicle.

12. An electric vehicle comprising the power supply system of claim 2, wherein the electric vehicle is a mining vehicle or a transit vehicle.

13. A method comprising:
    receiving an alternating current at an onboard rectifier disposed onboard a vehicle, the alternating current originating from and initially transmitted by a power generating station via one or more transmission lines off-board the vehicle, the alternating current received by the onboard rectifier at a frequency that is at least a utility power line frequency;
    changing the alternating current into a direct current using the onboard rectifier; and
    supplying the direct current from the onboard rectifier to an electric propulsion system of the vehicle to power the electric propulsion system and propel the vehicle; and
    controlling a maximum voltage permitted to be conducted via the one or more transmission lines and thereby to limit the maximum voltage to a determined value that is based at least in part on an insulation value of the vehicle relative to ground.

14. The method of claim 13, wherein the alternating current is received at the frequency of at least five kilohertz.

15. The method of claim 13, further comprising:
    receiving the alternating current at an onboard transformer from the one or more transmission lines prior to receiving the alternating current at the onboard rectifier; and
    reducing a peak voltage of the alternating current using the onboard transformer prior to conducting the alternating current with the peak voltage that is reduced to the onboard rectifier.

16. The method of claim 13, wherein the alternating current is received by the onboard rectifier from the power generating station without the alternating current being rectified by an off-board rectifier between the power generating station and the vehicle.

17. The method of claim 13, wherein the alternating current is received by the onboard rectifier at the utility power line frequency that is at least fifty hertz and no more than sixty hertz.

* * * * *